United States Patent [19]

Haynes

[11] 4,024,609

[45] May 24, 1977

[54] WORM DRIVE HOSE CLIPS

[75] Inventor: Ronald Haynes, Stratford-on-Avon, England

[73] Assignee: Herbert Terry & Sons Limited, Redditch, England

[22] Filed: Apr. 14, 1976

[21] Appl. No.: 677,066

[52] U.S. Cl. .............................................. 24/274 R
[51] Int. Cl.² ......................................... F16L 33/08
[58] Field of Search ...... 24/274 R, 274 P, 274 WB, 24/68 B; 74/424.6

[56] References Cited

UNITED STATES PATENTS 3,398,440  8/1968  Bergstrom ....................... 24/274 R

FOREIGN PATENTS OR APPLICATIONS 2,053,159  5/1971  Germany ......................... 24/274 R
2,054,798  6/1971  Germany ......................... 24/274 R
567,031    1/1945  United Kingdom ............. 24/274 R
526,749    9/1940  United Kingdom ............. 24/274 R
545,487    5/1942  United Kingdom ............. 24/274 R Primary Examiner—Bernard A. Gelak
Attorney, Agent, or Firm—Marshall & Yeasting

[57] ABSTRACT

A worm drive hose clip comprises a housing, a band having one end secured to the housing and the other end passed through the housing, and a screw which is effectively journalled in the housing and held axially captive therein. Teeth are formed on one face of the band for engagement with the screw, each of which has a crest which is concave along a central portion of its length extending transversely of the band. The root-to-crest height of the central portion of each tooth increases toward each end of said central portion of the crest.

6 Claims, 3 Drawing Figures

WORM DRIVE HOSE CLIPS

BACKGROUND OF THE INVENTION

This invention relates to worm drive hose clips of the kind comprising a housing, a band having one end secured to the housing and the other end or tail passed through the housing, and a screw which is effectively journalled in the housing and held axially captive therein, the screw having threads which engage with teeth formed in or on the band so that rotation of the screw moves the said tail relative to the housing and hence contracts or expands the loop formed by the band.

The object of the invention is to provide an improved clip.

SUMMARY OF THE INVENTION

In accordance with the present invention a clip of the kind referred to is characterised by the provision of teeth each of which has a crest which is concave along a portion of its length extending generally transversely of the band.

Preferably the inter tooth roots of the band are laterally planar over a substantial proportion of the length of the crest concavity.

By the concavity and planarity combined, lateral movement of the band in the housing due to necessary tolerances and resulting when torque is applied to the screw, does not reduce the surface area of engagement between teeth and screw threads, and may result in slight increase of the engage area.

Preferably also the teeth are in part raised from the band and the roots are recessed into the band.

In accordance with another feature of the invention, the whole of the width of the band is made slightly concave, when viewed in cross-section from the screw engaged side or exterior of the band loop, and slightly convex when viewed from the opposite side or interior of the loop, and this may avoid a hose, being clamped by the band, from being damaged when the band is tightened.

The band may be made by a pressing or rolling operation, or a combination of pressing and rolling operations.

DESCRIPTION OF THE PREFERRED EMBODIMENT

Figure 1:
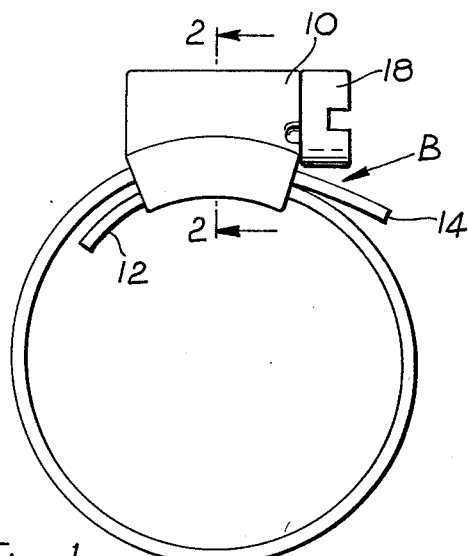
FIG. 1 is a side elevation of a worm drive hose clip.

Referring to the accompanying drawings, and first to FIG. 1 thereof, the hose clip illustrated comprises a housing 10, having one end 12 of the band secured thereto and the other end 14 of the band passed through the housing so as to engage with the screw journalled in the housing, the end of the screw being indicated by the reference 18.

Figure 2:
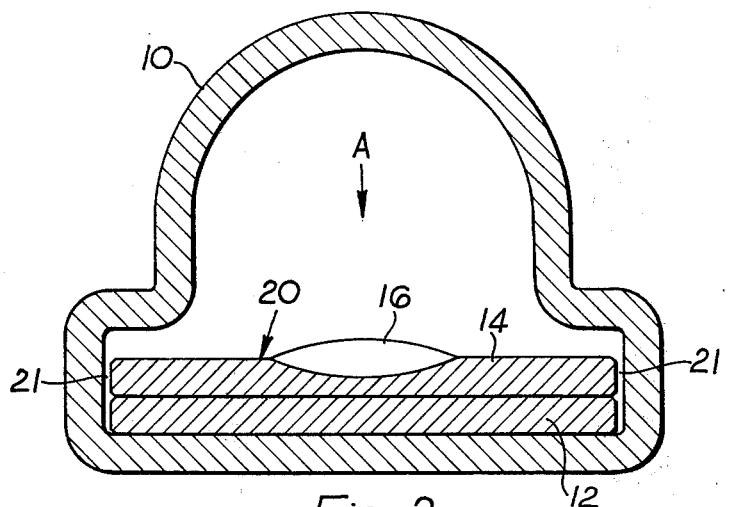
FIG. 2 is a section taken on the line 2—2 of FIG. 1, on an enlarged scale, and with the screw removed for clarity showing a band construction which is at present conventional and distinct from the band construction provided by the present invention.

In the prior art arrangement illustrated in FIG. 2, teeth 16 are formed in and on the band by a pressing operation for example so that the crest of each tooth is convex when viewed from the direction of arrow A FIG. 2 and the convexity extends above the generally planar surface 20 of the band. The teeth flanks are recessed into the thickness of the band so that the root between each two teeth is concave in a transverse direction when viewed from the direction of said arrow A.

For manufacturing purposes it is necessary to provide tolerances between the parts for example as indicated by the gaps 21 between the lateral edges of the band and the walls of the housing. The inevitable result of applying torque to the screw is to drive the band laterally which displaces the teeth 16 relative to the interengaging screw threads and reduces the area of contact between the teeth flanks and the screw thread flanks, thus reducing the efficiency of the clip.

Any attempts to increase the height of the teeth 16 in the arrangement of FIG. 2 are limited because of the necessity for the tail 14 to clear the head of the screw 18 in the area indicated by the arrow B FIG. 1. Higher teeth would effectively necessitate the tail 14 being required to deflect radially towards the centre of the band loop to provide clearance past the head, and this would probably reduce the number of band teeth which could engage fully with the screw threads so that any gain from the one source would be mitigated by a loss from the other factor.

Figure 3:
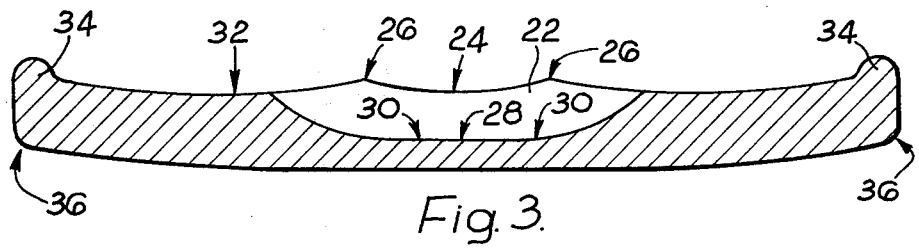
FIG. 3 is a transverse section, on a further enlarged scale, showing the band construction of the present invention.

Turning now to FIG. 3 illustrating the band in accordance with the present invention, this is provided with teeth 22 which may be formed by a pressing or rolling operation or a combination of such operations, and which extend above the upper surface of the band and have their flanks recessed into the band in generally the same way as in FIG. 2, but essentially the band teeth include a concavity 24 extending between the cusps 26 and this factor alone ensures that as the band moves laterally, taking up manufacturing tolerances, the engaged surface area of the tooth flanks with the screw thread flanks at least remains constant.

As illustrated, the inter-tooth roots comprise a planar portion 28 extending between points 30 which are symmetrically related with respect to the cusps 26, so that in fact the engaged surface area may increase during lateral movements.

As also shown in FIG. 3, the tooth crests taper downwardly to the upper surface 32 of the band at the extremities of the length of the crest, and the root profile extends concavely to the same points on the upper and outer surface of the band.

Moreover, FIG. 3 illustrates that the band is generally concave as viewed from the direction of arrow A on its outer surface and generally convex on its inner surface, and beads 34 are provided at the band extremities: the beads may represent metal displaced in providing the radiussed corners 36 which protect the hose or like during clamping.

It is believed that worm drive hose clips made in accordance with the present invention may have substantially higher efficiency without failure than a conventional clip as illustrated in FIG. 2.

I claim:

1. A worm drive hose clip comprising a housing, a band having one end secured to the housing and the other end passed through the housing, and a screw which is effectively journalled in the housing and held axially captive therein, wherein the improvement comprises teeth formed on one face of the band for engagement with the screw, which are in part raised from the band and the roots of which are recessed into the band and each of which has a crest which is concave along a central portion of its length extending transversely of the band, the root-to-crest height of the central portion of each tooth increasing toward each end of said central portion of the crest.

2. A clip as claimed in claim 1 wherein the opposite face of the band is non-concave over the entire width of the band.

3. A clip as claimed in claim 1 wherein each end portion of the crest of each tooth merges with the central portion to form a cusp.

4. A clip as claimed in claim 1 wherein the inter tooth roots of the band are laterally rectilinear over a substantial proportion of the length of the crest concavity.

5. A clip as claimed in claim 4 wherein each end portion of the crest of each tooth merges with the central portion to form a cusp.

6. A clip as claimed in claim 1, wherein the band is concave in cross-section when viewed from the screw engaged side and convex when viewed from the opposite side.

* * * * *